US008521579B2

(12) United States Patent
Witting

(10) Patent No.: US 8,521,579 B2
(45) Date of Patent: Aug. 27, 2013

(54) PREDICTING MARKETING CAMPAIGNS HAVING MORE THAN ONE STEP

(75) Inventor: Thomas Witting, Heidelberg (DE)

(73) Assignee: SAP AG, Walldorf (DE)

( * ) Notice: Subject to any disclaimer, the term of this patent is extended or adjusted under 35 U.S.C. 154(b) by 2768 days.

(21) Appl. No.: 10/445,722

(22) Filed: May 27, 2003

(65) Prior Publication Data

US 2004/0204982 A1 Oct. 14, 2004

Related U.S. Application Data

(63) Continuation-in-part of application No. 10/413,442, filed on Apr. 14, 2003, now abandoned.

(51) Int. Cl.
*G06Q 10/00* (2012.01)

(52) U.S. Cl.
USPC .......................................................... 705/7.31

(58) Field of Classification Search
USPC ........................................................ 705/7–12
See application file for complete search history.

(56) References Cited

U.S. PATENT DOCUMENTS

| | | | | |
|---|---|---|---|---|
| 5,974,396 | A * | 10/1999 | Anderson et al. | 705/10 |
| 6,026,397 | A * | 2/2000 | Sheppard | 707/5 |
| 6,073,112 | A * | 6/2000 | Geerlings | 705/14 |
| 6,236,977 | B1 * | 5/2001 | Verba et al. | 705/10 |
| 6,240,411 | B1 | 5/2001 | Thearling | |
| 6,839,682 | B1 * | 1/2005 | Blume et al. | 705/10 |
| 6,847,934 | B1 * | 1/2005 | Lin et al. | 705/10 |
| 6,954,731 | B1 * | 10/2005 | Montague | 705/10 |
| 6,970,830 | B1 * | 11/2005 | Samra et al. | 705/10 |
| 7,003,476 | B1 | 2/2006 | Samra et al. | |
| 7,006,979 | B1 | 2/2006 | Samra et al. | |
| 7,010,495 | B1 | 3/2006 | Samra et al. | |
| 2002/0052775 | A1 * | 5/2002 | Fisher et al. | 705/10 |
| 2003/0176931 | A1 * | 9/2003 | Pednault et al. | 700/31 |
| 2007/0244741 | A1 | 10/2007 | Blume et al. | |

OTHER PUBLICATIONS

Barnett, Comparative Statistical Inference, Wiley Series in Probability and Mathematical Statistic, Third edition, 1999, p. 108.*
Jonker et al., Evaluating Direct Marketing Campaigns; Recent Findings and Future Research Topics, Econometric Institute Report 9851/A, Nov. 1998.*
Rosset et al., Evaluation of Prediction Models for Marketing Campaign, ACM 2001.*
Basu et al., Modeling the Response Pattern to Direct Marketing Campaigns, Journal of Marketing Research, May 1995.*

(Continued)

*Primary Examiner* — Peter Choi
*Assistant Examiner* — Nadja Chong Cruz
(74) *Attorney, Agent, or Firm* — Fish & Richardson P.C.

(57) ABSTRACT

Methods and systems for assigning customers to steps in marketing campaigns. An assignment module assigns and reassigns the customers to the marketing activities. An evaluation module determines a predicted goal value of the marketing campaign for each assignment. The assignment module does not reassign a customer to a marketing activity that the customer has previously been assigned to. An execution module may execute campaign steps by performing marketing activities, and a response detection module may detect responses from the customers. The responses may be used in determining subsequent steps of the campaign. Creating sample target groups representative of the customers that are predicted to respond to a prior campaign step. The sample target group(s) may be used for predicting the outcome of subsequent campaign steps directed at the sample target group.

18 Claims, 4 Drawing Sheets

(56) References Cited

OTHER PUBLICATIONS

PowerPoint Presentation, CRM Analytics: RFM Analysis, SAP AG, 24 ps.

http://www.unicacorp.com/products/compaign_detail.html—"Enterprise Marketing Management—Unica Corporation," printed from the Internet Aug. 13, 2003, 4 ps.

http://www.marketswitch.com/products/outbound_marketing.html—"Marketswitch: Products: TRUE for Outbound Marketing," printed from the Internet Aug. 13, 2003, 2 ps.

"Operations Research-Spektrum," Springer-Verlag, vol. 11, No. 3, ps. 121-174, Aug. 1989.

"Tabu Search—Part I," ORSA Journal on Computing, vol. 1, No. 3, Summer 1989, 18 ps.

"Tabu Search—Part II," ORSA Journal on Computing, vol. 2, No. 1, Winter 1990, 30 ps.

"Future Paths for Integer Programming and Links to Artificial Intelligence," Computers & Operations Research, vol. 13, No. 5, ps. 533-549, 1986.

"Introduction to CRM Analytics," Gartner Symposium IT XPO, 2002, 19 ps.

http://www.cogita.co.nz/epicor.htm—"Epicor Product Page," printed from the Internet Jan. 28, 2003, 3 ps.

"EMEA CRO Magic Quadrant—3Q02," Markets, M-17/2063, J. Radcliffe, G. Herschel, Gartner Research, 2002, 7 ps.

"EMEA CRO Magic Quadrant—3Q02," Decision Framework, J. Radcliffe, Gartner Research, 2002, 7 ps.

"A Tutorial on Tabu Search," Alain Hertz, Eric Taillard, Dominique de Werra, 13 ps.

"Alternative Data Report," Gartner, 2000-2002, 85 ps.

http://www.epiphany.com/products/images/screen_1CM.gif—"PortaLaptop," printed from the Internet Jan. 28, 2003, 1 p.

http://www.epiphany.com/products/images/screen_3RT.gif—"Ideal Customer," printed from the internet Jan. 28, 2003, 1 p.

http://www.epiphany.com/products/images/screen_eirt2.gif—"RealTime Decisioning Analysis," printed from the Internet Jan. 28, 2003, 1 p.

http://www.epiphany.com/products/images/screen_2CME.gif—"Import E-mail Content," printed from the Internet Jan. 28, 2003, 1 p.

"Campaign Management Software," Quaero Answers, 2001, 13 ps.

http://www.peoplesoft.com/corp/en/products/line/crm/marketing/features.asp—"Marketing Features," printed from the Internet Jan. 28, 2003, 2 ps.

\* cited by examiner

PREDICTING MARKETING CAMPAIGNS HAVING MORE THAN ONE STEP

This application is a continuation-in-part and claims priority to U.S. patent application Ser. No. 10/413,442, filed Apr. 14, 2003 and entitled "ASSIGNING CUSTOMERS TO ACTIVITIES IN MARKETING CAMPAIGNS."

TECHNICAL FIELD

The invention relates to marketing campaigns.

BACKGROUND

Automated marketing campaigns may involve one or more computers controlling campaign activities directed to groups of existing and/or prospective customers. Typically, a company engages in a marketing campaign as a way of communicating specific business messages. For simplicity, all the recipients of such marketing messages will here be referred to as customers, whether or not they have an existing customer relationship with the company. The messages usually can be anything from a pure advertisement to a direct offer, which the customer may accept. Frequently, the company running a marketing campaign seeks an initial response from a customer to gauge interest in the subject of the campaign, and then intends to use the response in directing further campaign activities toward that customer.

In essence, running a marketing campaign consists of deciding which customers (i.e., which target group) should receive what offer (or communication) and thereafter executing the campaign accordingly. It is necessary to decide which customers to include in the campaign and which to leave out. Moreover, it must be decided which campaign activities should be performed in the campaign—and to which individual customers—and which campaign activities should not be used.

In addition, companies are often interested in trying to predict the outcome of a marketing campaign before it is carried out. Software programs have therefore been developed that use statistical relations and probabilities as a way of estimating what may be the results of the marketing campaign in terms of response rate, revenue, net profit, etc. In other words, such a program may assign a particular target group to a certain campaign activity and try to predict the outcome of actually executing that campaign activity toward the target group.

Target groups, however, can be very large_on the order of several hundred thousands, or millions, of customers or more. It follows that even with a modest number of alternative campaign activities, there may be a great number of possible combinations of customer-activity assignments. It would be easy to simply assign the customers to marketing activities at random, but this approach is not very likely to result in optimum results for the marketing campaign.

One suggested way of optimizing the assignment of customers to campaign activities is the sometimes-called "Greedy" approach. This involves assigning the customers one at a time, and for each new assignment calculating the effect on the predicted result of the marketing campaign. Assume that using this process, 1,000 customers have already been assigned to four campaign activities. That is, each of the 1,000 customers presently is assigned to one of the four campaign activities. The Greedy approach then prescribes that the 1,001st customer should be assigned to that campaign activity that will most increase the predicted result of the campaign. The Greedy approach determines the predicted effects of assigning the 1,001st customer to each of the four campaign activities and thereafter selects the best one. This process is repeated for the 1,002nd customer, and so on. The Greedy approach stops when it cannot improve the predicted results without ignoring a constraint on the marketing campaign.

There are, however, drawbacks with applying the Greedy approach by itself. The Greedy approach is likely to find some maximum in the predicted campaign result, because it continues to assign the customers until it cannot improve the predicted result any further. But this maximum may be only a "local" maximum, that is, it may be greater than what is predicted for all similar customer-activity assignments, but it may be less than a "global" maximum that is the best possible results than can be predicted given the particular set of customers and activities. And because the Greedy approach always moves toward increased predicted results, it may be incapable of "leaving" a local maximum, because any change in the locally optimal-customer-activity assignments may lead to a decrease in the predicted value.

It has been attempted to overcome some of these disadvantages, for example by using what is sometimes referred to as a "Taboo" search. In order to have the algorithm depart from a local maximum it has identified, it becomes necessary to allow a decrease in the goal value. A Taboo search typically records 20 or so of the most recent assignments of customers to marketing activities in a Taboo list. As long as an assignment is on the Taboo list, the Taboo search will not try that assignment again. This arrangement is used with the expectation or hope that the Taboo search will not revert to a previously visited local maximum, because the most recent assignments are "off limits" as long as they remain on the Taboo list.

But also the Taboo search may have disadvantages. Despite the use of the Taboo list, it is possible that the search algorithm will return to a previously visited local maximum, because the previous assignments are only blocked off temporarily. Revisiting an earlier local maximum does not bring the Taboo search any closer to the optimal result; rather, the search may exhibit a circular pattern of repeatedly identifying the same local maximum. The fact that the Taboo search has some tendency to return back to previous local maxima affects its ability to efficiently and quickly locate an overall, global, maximum.

SUMMARY OF THE INVENTION

The invention relates to marketing campaigns and may be embodied in methods, systems and instructions for executing inventive methods. In a first general aspect, the invention provides a method of predicting outcomes of marketing campaigns comprising more than one campaign step. The method comprises predicting a number of responses to be received if a first campaign step were performed toward a first target group of customers, each customer having a response probability. The method comprises selecting a second target group from the first target group using the response probabilities, the second target group being substantially equal to the predicted number of responses. The method comprises predicting an outcome of performing a second campaign step toward the second target group.

In selected embodiments, the response probabilities are numbers within a range, and selecting the second target group comprises: randomly selecting a number in the range for a customer in the first target group; comparing the randomly selected number to the customer's response probability and including the customer in the second target group if the randomly selected number is less than the customer's response probability; and performing the selecting and comparing steps for all customers in the first target group. The response probabilities may be numbers in the range of 0 to 1.

In some embodiments, the second target group is adjusted to be equal to the predicted number of responses. If the second target group initially is smaller than the predicted number of responses, the customers in the first target group that were not included in the second target group are sorted according to their response probabilities. Those customers that have the highest response probabilities are added to the second target group so that it becomes equal to the predicted number of responses. If the second target group initially is greater than the predicted number of responses, the customers in the second target group are sorted according to their response probabilities. Those customers that have the lowest response probabilities are removed from the second target group so that it becomes equal to the predicted number of responses.

In a second general aspect, the invention provides a system for predicting outcomes of marketing campaigns comprising more than one campaign step. The system comprises program instructions comprising a response prediction module that, when executed by a processor, predicts a number of responses to be received if a first campaign step were performed toward a first target group of customers, each customer having a response probability. The system comprises program instructions comprising an assignment module that, when executed by a processor, selects a second target group from the first target group using the response probabilities, the second target group being substantially equal to the predicted number of responses. The system comprises program instructions comprising an evaluation module that, when executed by a processor, predicts an outcome of performing a second campaign step toward the second target group. In a third general aspect, the invention provides computer software, tangibly embodied in at least one of a computer-readable medium and a propagated carrier signal, for predicting outcomes of marketing campaigns comprising more than one campaign step. The software comprises instructions to perform operations comprising: predict a number of responses to be received if a first campaign step were performed toward a first target group of customers, each customer having a response probability; select a second target group from the first target group using the response probabilities, the second target group being substantially equal to the predicted number of responses; and predict an outcome of performing a second campaign step toward the second target group.

Advantages of the invention may include one or more of the following. Improving multi-step marketing campaigns by predicting their outcomes and using the predicted results in revising the campaigns. Improving chances of identifying unprofitable or undesirable marketing campaigns or steps thereof before they are launched. Being able to predict an entire multi-step campaign step-by-step. Being able to predict subsequent steps after executing a step of the campaign. Finding superior customer-activity assignments by improved optimization. Avoiding the disadvantage of repeatedly returning to a local maximum. Enabling the optimization to seek additional maxima.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numerals in the drawing indicate like elements.

DETAILED DESCRIPTION

Figure 1:
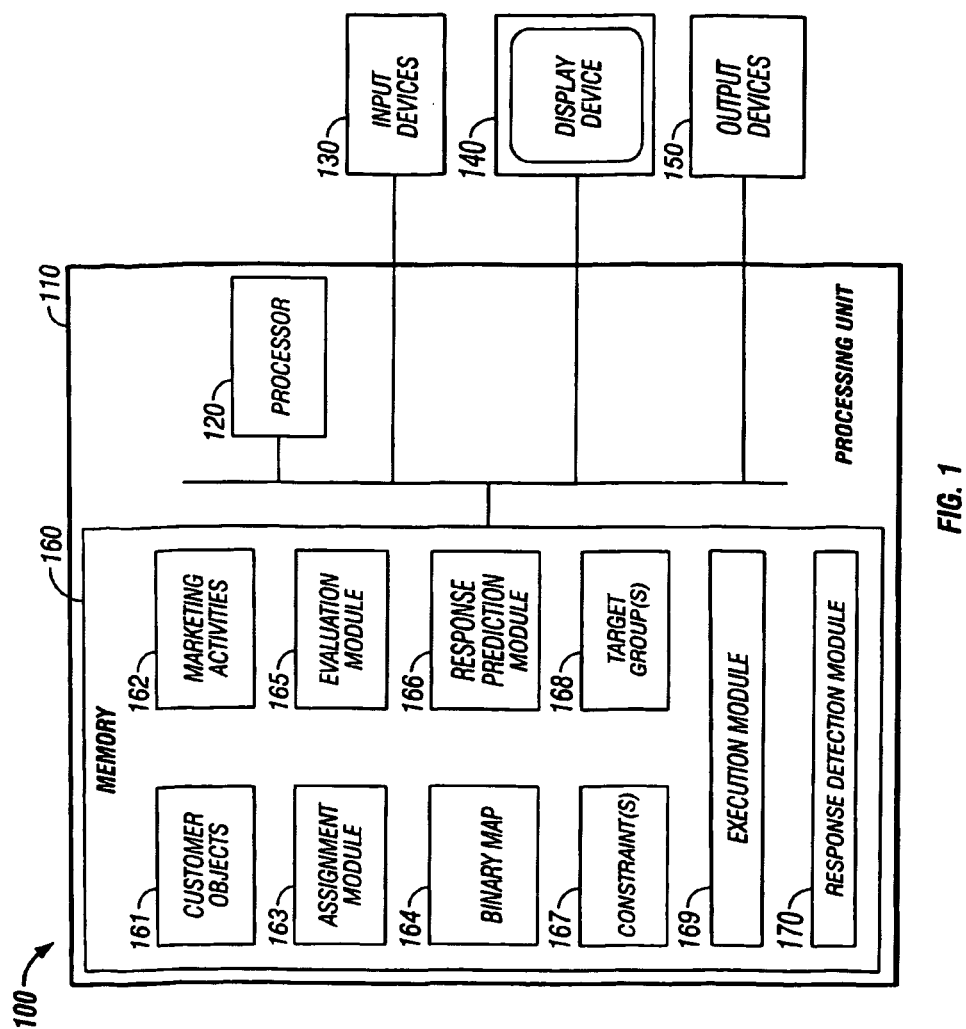
FIG. 1 is a block diagram of a computer system containing components in accordance with the invention.

FIG. 1 is a block diagram of a computer system 100 containing components according to the invention. The system 100 contains a processing unit 110 with a processor 120 that, among other things, executes instructions stored in memory. Input devices 130 are operably connected to the processor 120. For example, the input devices 130 may include a mouse, a keyboard, or devices with additional functionality as will be described later. A display device 140 may be operably connected to the processor 120 and may provide video output for the system 100. For example, the display device 140 may display one or more screens for a user of the system 100. Output devices 150 may be operably connected to the processor 120, for example to output information to the user of the system 100 or as part of running a marketing campaign as will be described later.

The processing unit 110 may comprise a memory 160 operably connected to the processor 120. As is conventional, the memory of the processing unit 110 may include random access memory (RAM), read-only memory (ROM), or a combination of RAM and ROM. The ROM may provide non-volatile data storage for the system 100. During operation, program instructions may be loaded into the RAM such that the processor 120 can execute them.

The memory 160 may comprise customer objects 161, which are data structures representing customers to which marketing campaigns may be directed. The memory 160 may comprise marketing activities 162, which represent steps of marketing campaigns that can be performed by the system 100. An assignment module 163 may be capable of assigning each of the customer objects 161 to specific ones of the marketing activities 162. By assigning a customer object to a marketing activity, the assignment module 163 provides that when the marketing activity is performed, it will be directed to that customer (and to any additional customer who may also have been assigned to the activity.) The assignment module 163 may record the assignments in a binary map 164. For example, the binary map 164 may comprise flags settable for each possible customer-activity assignment.

The memory 160 may comprise an evaluation module 165 that is capable of determining a predicted value of the marketing campaign for each assignment of the customer objects 161 to the marketing activities 162. As will be described later, the evaluation module may use different values of the marketing campaign in this regard. The evaluation module 165 may use probability relations in making its determinations. For example, the evaluation module 165 may use a response prediction module 166 to determine the predicted response from individual customers. The response prediction module may use a "response, frequency, monetary" (RFM) analysis such as that available in products from SAP AG, Walldorf (Baden), Germany. For example, the response prediction module 166 may identify one or more customers that are very unlikely to generate profitable responses. This information may be used to remove the corresponding customer object from the target group such that no assignment(s) of that customer object to any of the marketing activities is made.

The memory 160 may comprise constraint(s) 167 applicable to one or more marketing campaigns. For example, constraint(s) 167 may be defined by a user who is creating a marketing campaign in the system 100. The assignment module 163 or the evaluation module 165 may reject assignments of the customer objects 161 to the marketing activities 162 that are inconsistent with one or more of the constraints 167. The constraints 167 may be defined as upper or lower limits as applicable.

The system 100 may create target group(s) 168 from some or all of the customer objects 161. A target group 168 is a collection of those customer objects 161 to which at least one of the marketing activities 162 is to be directed. For example, if the system 100 identifies a particular assignment of the customer objects 161 to the marketing activities 162 as the most advantageous under the constraints 167, it may store the customer objects 161 as a target group 168 associated with its respective marketing activities 162.

The system 100 may include an execution module 169 that is capable of executing marketing campaigns comprising one or more marketing activities 162. The execution module 169 may execute the marketing activities 162 toward the particular customer objects included in target group(s) 168. For example, when one of the marketing activities 162 comprises sending emails to the target group(s) 168, the execution module 169 may cause the emails to be sent using output devices 150.

The system 100 may include a response detection module 170 that detects responses from the customers to the marketing activities 162. The response detection module 170 may detect the responses through input devices 130. For example, when a customer responds to a marketing activity 162 by email, the response detection module 170 may detect the email through input devices 130.

The modules and other components just described in memory 160 could be combined or separated in various manners. They may be stored in RAM, ROM, or in combinations thereof, and they need not all reside in system 100 simultaneously. For example, the modeling of a marketing campaign and the execution of the marketing campaign, both of which will be described later, may be performed on different systems.

Figure 2:
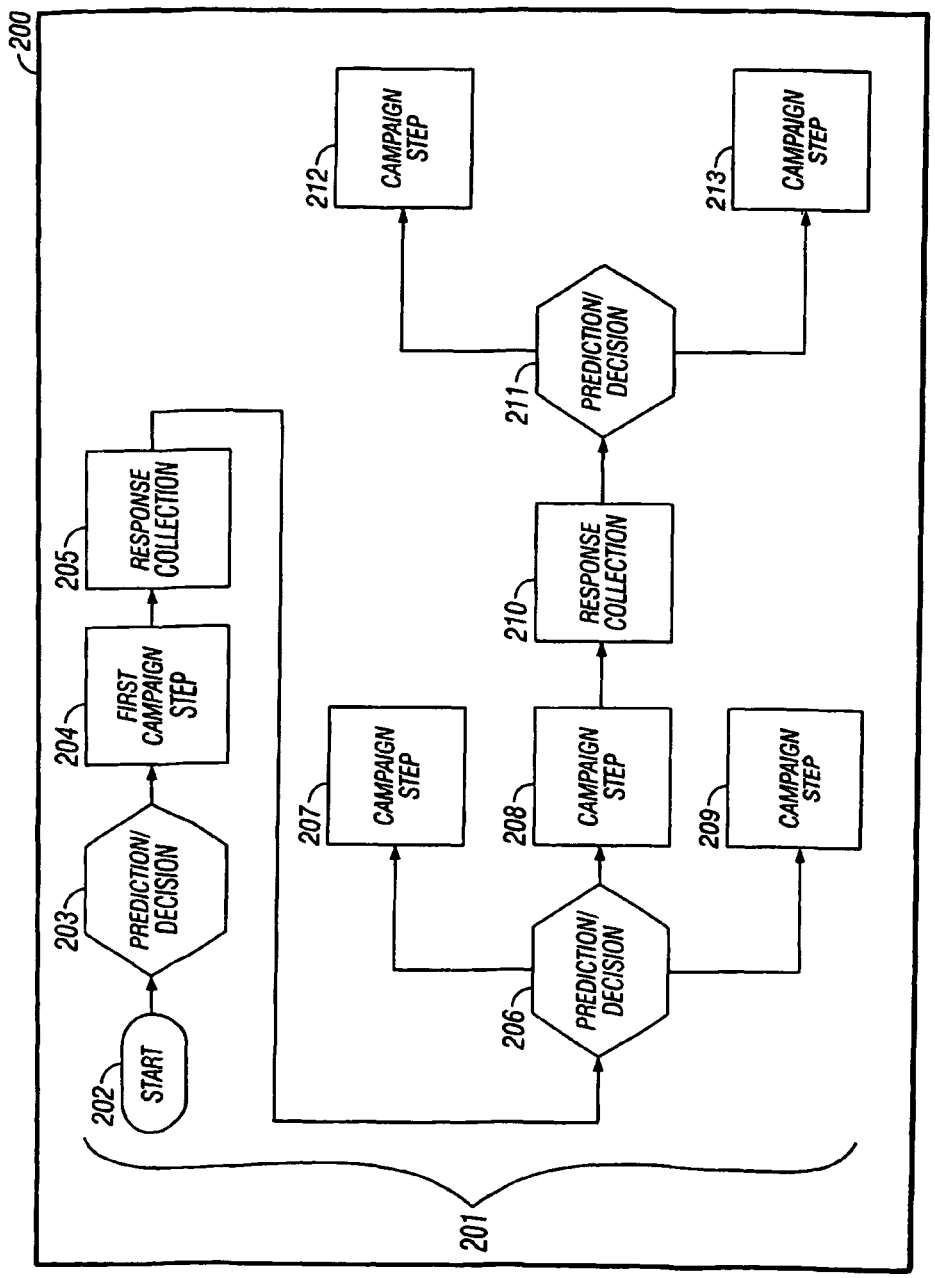
FIG. 2 is a schematic illustration of a view that may be displayed by the system in FIG. 1.

FIG. 2 shows an exemplary view 200 that may be displayed on the display device 140 during operation of the system 100. The view 200 may be displayed when the system 100 is being used to model a marketing campaign 201. The view 200 may also be displayed when the system 100 is used for predicting the outcome of a campaign. Thus, the illustrative campaign 201 could have been modeled in the system 100 or created elsewhere and imported to the system 100, for example through input devices 130.

It can be seen that three different types of graphical elements (to be described below) have been used in the campaign 201, for example: start step 202, prediction/decision ("p/d") step 203 and campaign step 204. The system 100 allows the user to associate the graphical elements with each other to indicate their relation. For example, the campaign 201 has arrows from one step to another to indicate the order of the steps. The system 100 may make templates of these steps available to the user in the view 200 so that the user can select one or more of them for the campaign 201, as appropriate. The system 100 may also make other steps and functions available for the user to apply to the campaign 201 that are not shown in view 200 for simplicity.

The user may begin creating the campaign 201 using the start step 202. After the start step 202, the user may place a p/d step 203, followed by a first campaign step 204. At this or another stage, the user may decide which target group is to be used for the first campaign step 204. The user may select the target group among those available in memory 160. For example, the user may decide to begin the campaign 201 with a target group consisting of all customers of record. The p/d step 203 may then predict the rate of response to the first campaign step 204 from the customers in the target group.

In an example of what the campaign 201 may include, the first campaign step 204 may include sending a letter to the customers in the target group. The result predicted in p/d step 203 may comprise the information contained in Table 1.

TABLE 1

| Campaign Value | First Campaign Step: Letter |
|---|---|
| Number of Customers in Target Group | 200,000 |
| Predicted Number of Responses | 9,450 |
| Predicted Response Rate (%) | 4.73 |
| Predicted Revenue ($) | 0 |
| Predicted Gross Profit ($) | 0 |
| Contact Costs ($) | 60,000 |
| Response Costs ($) | 0 |
| Predicted Net Profit ($) | −60,000 |

The target group contains 200,000 customers and the p/d step 203 predicts that 9,450 of them, or 4.73%, will respond to this type of letter. This response rate may have been determined using the response prediction module 166. In this example, the letter seeks a response from the customers indicating that they are interested in receiving further marketing material and/or offers (which will be included in subsequent campaign steps). The predicted revenue from the first campaign step 204 alone may therefore be zero. The contact costs refers to the cost in sending out the letters. This may be a value that the user enters into the system 100 and in this example it has been set at $60,000. Response costs will be described below but do not apply to the first campaign step in this example and are therefore set to zero. Accordingly, the predicted net "profit" from the first campaign step 204 is minus $60,000. Here, the p/d step 203 comprises predicting the values of the campaign 201 shown in Table 1 when all of the customers in the target group were subjected to the campaign step 204. Thus, the "decision" made in p/d step 203 was to assign all of the customers to the same first campaign step 204. It will be described below how a p/d step may involve deciding to which of several possible campaign steps a customer should be assigned.

A response collection step 205 may allow the system 100 to collect the received responses. For example, responses may be input to the system 100 using input devices 130. It is possible that customers will respond over a period of time, and the response collection 205 may for example be done continuously over that time period or at intervals or at some time prior to execution of the next step in the campaign 201.

The p/d step 206 evaluates the received responses and predicts the results of assigning the responding customers to one of the campaign steps 207, 208 and 209. In this example, campaign step 207 may involve mailing the company's shopping catalog to a target group; campaign step 208 may involve mailing a brochure of the company's top-selling products to the target group; and campaign step 209 may involve emailing an offer to the target group. To predict the results of these campaign steps, the costs of executing the respective steps per addressed customer must be known. Table 2 below lists exemplary values that may be used in p/d step 206.

TABLE 2

|  | Camp. Step 207 Mail Catalog | Camp. Step 208 Mail Brochure | Camp. Step 209 Email Offer |
| --- | --- | --- | --- |
| Predicted Revenue per Response ($) | 115 | 95 | 85 |
| Profit per Response ($) | 78 | 59 | 65 |
| Cost per Contact ($) | 3 | 2.50 | 0.20 |
| Cost per Response ($) | 0 | 0 | 8.50 |
| Response Model | MAIL01 | MAIL02 | EMAIL01 |
| Default Rate (%) | 13 | 15 | 14 |

For mailing the catalog (campaign step 207), the predicted revenue per response is $115. This average may be derived from the company's past sales experiences and may be a variable settable by the user. For example, the company may know that when customers place orders after receiving the company's catalog in the mail, the average buying customer places a $115 order. Of the $115 revenue from an average response, the profit is $78. From this should be deducted the cost of the catalog and of shipping the catalog, here $3, which is labeled cost per contact. Thus, the predicted net profit for the average response is $75.

In this example, the predicted revenue and profit per response and the costs per contact and response are based on average values. In other embodiments, one or more of them may be determined individually for each customer. For example, the evaluation module 165 may read the customer's history of placing orders or renewing contracts, as the case may be, and use it to predict the revenue or profit from that customer. The predicted revenue or profit is then used in evaluating the predicted outcome of directing particular campaign steps at that customer. The evaluation module 165 may determine individual contact costs by applying the specifics of the mode of contact (e.g., a personal visit by a sales representative) to the particulars of the current customer. For example, the number of hours needed for a visit can be estimated from the customer's geographic location, and the hours can be multiplied with the hourly cost of the sales representative. Similarly, the cost per response can reflect a discount typically given to a particular customer.

The two other campaign steps have corresponding values, resulting in a predicted profit per response of $56.50 for mailing the brochure (campaign step 208) and $56.30 for sending the offer by email. In the latter calculation, a cost per response of $8.50 has been deducted from the profit per response. This may reflect a discount of the sales price that is given to the recipients of the email offer, which discount accordingly decreases the predicted net profit per response by an equal amount. Now, to determine the overall profit, it should be taken into account how many responses can be expected from the target group.

Table 2 lists two ways of predicting the rate of responses. Response model means that the p/d step 206 involves using the response prediction module 166 to obtain a prediction based on the individual customers in the target group. Thus, the response rate predicted using this alternative may differ between different customers. Here, the illustrative response models used by the response prediction module 166 for the campaign steps 207, 208 and 209 are called MAIL01, MAIL02 and EMAIL01, respectively. The default rate, in contrast, which is listed below the response model in Table 2, may be an average response rate concluded without regard to the particular target groups. For example, the company may know from prior experiences that the average response rates for mailing catalogs is 8.5%, and that the average response rates for mailing brochures and sending offers by email are 6.3% and 4.5%, respectively. The default rates may be settable by the user. If the response model is unable to make a prediction for a customer, the default rate will instead be used for that customer.

It now becomes desirable to specify the marketing campaign further by assigning customers to specific ones of the alternative second campaign steps 207, 208 and 209. The relevant customers for the second campaign step are those that were predicted to respond to the first marketing step. Table 1 shows that 9,450 customers were predicted to respond.

The assignment module 163 may use an optimizing algorithm for this purpose. The algorithm may for example proceed by assigning all of the customers to various ones of the available campaign steps. For each assignment, the predicted value of the campaign resulting from the assignment is determined. It is also evaluated whether each assignment is consistent with the constraints 167 on the marketing campaign, if there are any. As long as the new assignments improve the predicted result, i.e. the goal value(s), the algorithm has not yet identified a maximum in the predicted result. Once all customers have been assigned to specific campaign steps, the algorithm may reassign individual customers to different campaign steps in an attempt to further increase the predicted goal value of the campaign and perhaps identify a global maximum of the goal value.

Eventually, the algorithm may find a maximum, potentially a local maximum, which is here referred to as a best goal value. Having found a best goal value, the algorithm may then continue assigning and reassigning customers (without reassigning a customer to an old marketing activity) in an attempt to find a higher, perhaps global, maximum. During this search phase, the algorithm may tolerate a decrease in the goal value.

The assignment module 163 may use different predicted values of the marketing campaign. For example, one or more of the costs of the campaign, the profits of the campaign, or the number of customers responding to the campaign may be used. In this regard, relative terms such as "increase," "maximum" etc. should be understood in context of the goal value that is being used. The object of the algorithm is to improve the goal value by making reassignments. Some goal values should be decreased to improve them. Thus, optimizing a goal value may involve minimizing it.

The algorithm does not reassign a customer to a campaign step that the customer has previously been assigned to. Each assignment of a customer to a campaign step may be recorded in a suitable file, such as the binary map 164. For example, the binary map 164 may be an object representing a two-dimensional array of flags: one dimension is the customers and the other is the marketing activities. The possible assignments of 200,000 customers to five marketing activities then would require the object to have one million settable flags. The object may have suitable operations defined for it, such as for setting and reading individual flags.

When a customer is assigned to one of the campaign steps, a flag corresponding to that assignment may be set in the binary map 164. By referring to the set flags in binary map 164 it can be ensured that no customer is reassigned to a campaign step that the customer has previously been assigned to.

It is, however, possible that the algorithm will not find a higher maximum after "leaving" an earlier found maximum.

The algorithm will come to a halt upon the occurrence of some interrupting event, such as a stop command from the system 100 or the user. For example, the algorithm may be terminated when the most recent 10,000 customer-activity reassignments have not improved the best goal value.

One may determine the particular customer-activity assignments corresponding to the best goal value by reversing all assignments made since finding the most recent best goal value. It may therefore be desirable to record the assignments in a list as they are being made after finding a best goal value. The list may be stored in the memory 160. The algorithm may be configured to terminate the search if the best goal value has not been improved after a certain number of assignments. The assignments can then be reversed back to the best goal value using the list. In contrast, should the algorithm find a better goal value that is consistent with the constraint(s) 167, there will be no need to return to the previous, less good, goal value and it may then be desirable to purge the list. After termination, the best assignment of the customers to the campaign steps may be stored as a final assignment such that the marketing campaign can be executed according to that assignment.

Using the best found assignment of customers to campaign steps it is possible to predict an overall result of the marketing campaign after the first and second campaign steps. Table 3 shows the marketing campaign prediction of Table 1 updated with the values discussed above.

Additional campaign steps may follow in the marketing campaign 201. For example, FIG. 2 shows that the responses from campaign step 208 are collected in step 210, which is followed by a p/d step 211. Response collection steps and additional campaign steps may follow after campaign steps 207 or 209 but have been omitted in FIG. 2 for clarity.

Prediction/decision step 211 may involve deciding which of campaign steps 212 and 213 should be directed at the customers who responded to campaign step 208. The assignment of customers to campaign steps may be done as described above with regard to the p/d step 206. Here, campaign step 212 may be a follow up letter directed to the customers who responded to the brochure received by mail. Campaign step 213 may likewise be a follow-up email. Additional response collection steps and/or campaign steps may follow upon any of the campaign steps 212 and 213, or upon any response collection or campaign steps subsequent to the campaign steps 207 or 209. The graphical illustration of the marketing campaign 201 in view 200 may conclude with a "stop" symbol (not shown) similar to the start symbol 202.

The predicted results may be used for several purposes. For example, the predicted profits for individual marketing activities may be analyzed. One characteristic that may be of interest is which marketing activities have relatively little impact on the outcome of the marketing campaign. If one of the marketing activities in Table 3, say the emailing step (209), yields a relatively small predicted profit compared to the other

TABLE 3

|  | First Campaign Step: Letter | Second Campaign Step: | | | Total 2nd Step | Total 1st and 2nd Steps |
|---|---|---|---|---|---|---|
| Campaign Value |  | Catalog | Brochure | Email | | |
| Number of Customers in Target Group | 200,000 | 5,500 | 2,350 | 1,600 | 9,450 | |
| Predicted Number of Responses | 9,450 | 717 | 336 | 224 | 687 | |
| Predicted Response Rate (%) | 4.73 | 13.05 | 14.3 | 14 | 7.3 | |
| Predicted Revenue ($) | 0 | 82,455 | 31,929 | 19,040 | 133,424 | 133,424 |
| Predicted Gross Profit ($) | 0 | 55,926 | 19,824 | 14,560 | 90,310 | 90,310 |
| Contact Costs ($) | 60,000 | 16,500 | 5,875 | 320 | 22,695 | 82695 |
| Response Costs ($) | 0 | 0 | 0 | 1904 | 1904 | 1904 |
| Predicted Net Profit ($) | −60,000 | 39,426 | 13,949 | 12,336 | 65,711 | 5,711 |

Thus, the above assignment of customers to the respective campaign steps resulted in 5,500 customers being assigned to campaign step 207, while 2,350 customers were assigned to campaign step 208, and 1,600 customers were assigned to campaign step 209. This resulted in the predicted net profits for the respective second campaign steps shown in the last row of Table 3. The predicted total net profit for the campaign consisting of the first and second campaign steps was $5,711.

It is possible that the algorithm will assign no customer to a particular campaign step. This suggests that based on the given set of addressable customers the campaign step should not be performed.

However, a maximum goal value may correspond to several different assignments of the customer objects to the marketing activities. One way to handle such a situation involves the evaluation module using a second goal value in addition to the one currently being used. The assignment module 163 may then select the customer-activity assignment that is predicted to yield the best second goal value.

activities, it may be desirable to omit this marketing activity from the marketing campaign. This may conveniently be done by setting a constraint 167 that the total number of customers assigned to the emailing step must be zero. As another example, analysis of the predicted profits (or another predicted goal value) may suggest a fruitful way of expanding the campaign. Assume, for example, that a constraint for the catalog step in Table 3 limited the total number of catalogs mailed to 5,500. According to the prediction, increasing that number should yield an even higher net profit for that marketing activity. It may therefore be decided, in view of the predicted results, to alter or remove one or more constraints on the marketing campaign.

Moreover, the entire campaign may be simulated by doing successive predictions of the individual steps, for example as will be described below.

Figure 3:
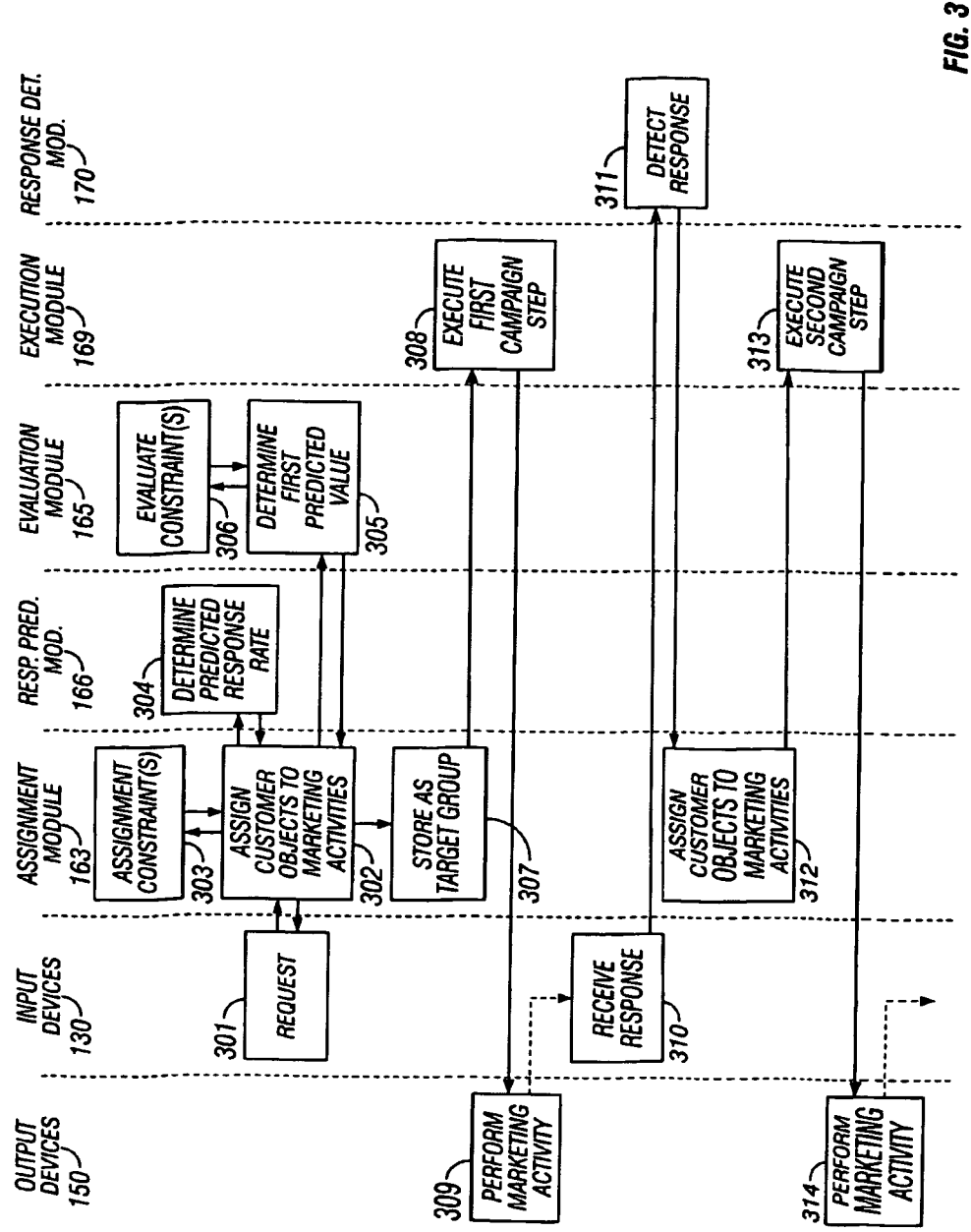
FIG. 3 is a flow diagram of a process that can be performed by the system in FIG. 1.

An exemplary operation of the system 100 will now be described with reference also to FIG. 3. In step 301, the system 100 receives a request to initiate the modules and processes that are involved in assigning the customers to marketing activities in a marketing campaign. Such a request may be given by a user of the system 100, for example through input devices 130. It is assumed in this description that the system 100 has access to the information necessary to carry out the assignments and to predict the resulting outcomes of the marketing campaign. For example, the marketing campaign may previously have been modeled on the system 100 using graphical symbols in view 200, in analogy with the description of FIG. 2 above.

Step 302 comprises the overall process run by the assignment module 163 to assign the customer objects to the marketing activities. This process may involve several separate steps, as will be described. The assignment module 163 may take constraint(s) 167 into account in step 303. For example, a constraint on the assignments may comprise that a certain customer should only be contacted by mail. This constraint may preclude the assignment module from assigning that customer object to a marketing activity that involves contacting the customer in a way other than by mail. As another example, a constraint may prescribe that any customer for which the system 100 does not have a telephone number stored should not be assigned to a campaign step that involves calling the customer.

The assignment module 163 may trigger the response prediction module 166 in step 304 to predict the responses that may be received, using information known about the individual customers. In step 305, the evaluation module 165 determines a first predicted value of the marketing campaign based on the predicted response(s) for a particular assignment of the customers to the marketing activities. For example, the first predicted value may be a goal value of the campaign such as its predicted net profit. Thus, step 305 may involve the evaluation module 165 predicting the net profit of the marketing campaign for the current assignment of customers to the marketing activities.

The evaluation module 165 in step 306 may take constraint(s) 167 into account in this determination and reject the particular assignment if it is not consistent with one or more of the constraints. The constraint may be one or more of a limitation on the marketing campaign, a limitation on the marketing activities, and a predicted number of customers responding to the campaign. For example, the marketing campaign may have constraints as to the total number of customers to be contacted in the campaign or the total number of customers to be contacted in any campaign step, which may be a limitation on the number of offers that are to be made in a campaign step. Additional examples of constraints include one or more of a budget for the marketing campaign, the predicted revenue, profits, or costs. Constraints may also be defined as a limitation on the communication channel (e.g., email or telephone) through which the customers will be contacted.

The assignment module may continue assigning and reassigning the customers to the marketing activities in step 302 consistent with the constraint(s) 167 as long as the first predicted value can be further improved. For each reassignment of the customers, the evaluation module 165 may determine an updated first predicted value (step 305). However, the assignment module 163 does not reassign a customer to a marketing activity that the customer has previously been assigned to. As part of step 302, the assignment module 163 may store each customer-activity assignment in the binary map 164, and refer to the binary map 164 to make sure that a customer is not reassigned to an old marketing activity.

The assignment module ceases to perform step 302 upon the occurrence of some interrupting event, such as determining that the most recent, say, 10,000 reassignments of customers have not improved the goal value. The current assignment of the customers may then be considered the final assignment and the customers may be stored as target group 168 in step 307. If the first campaign step should involve several possible marketing activities (as did the exemplary second campaign step in FIG. 2), the customers may be stored in separate target groups 168.

The system 100 executes the first campaign step in step 308. This may involve the assignment module 163 triggering the execution module 169 to perform the marketing activity/-ies of the first campaign step. For example, the execution module 169 may cause the output devices to send emails to selected customers in step 309. If the first step includes other marketing activities, such as sending letters to the customers, the execution module 169 may cause the letters to be automatically addressed to the customers and printed using the output devices 150. Other marketing activities may involve contacting the customers by telephone from a call center. The output devices 150 may be operably connected to the call center such that the execution module 169 may provide the call center with the names, telephone numbers and other relevant information about the customers that are to be contacted though the call center.

As discussed in the earlier examples, it is expected that customers will respond to the first marketing step, perhaps by placing an order with the company or by simply acknowledging their interest using a preformatted reply. However, the time during which the customers respond, and the way they communicate their response, may vary significantly. This is indicated by the dashed process flow from step 309 of performing the marketing activity to step 310 of receiving the customer responses. For example, customers may respond by emails that are received through the input devices 130. Another example is that a customer may respond through a website controlled by the company which channels the customer response to input devices 130. Additional ways for customers to respond include by letter, by telephone or fax, or by a personal contact with a company representative. In these examples, the customer response may be provided to system 100 in step 310 by entering the response information using input devices 130. For example, a visit activity report by the company representative may be typed in on a keyboard or provided as a data file from another computer.

In step 311, the response detection module 170 detects the received response(s). The response detection module may correlate the received responses with the corresponding customer objects, which were used in executing the first campaign step. The detection of responses may also trigger the execution of a second campaign step (to be described below) toward the responding customers. It is possible to direct a subsequent campaign step toward customers that did not respond to the first campaign step, for example in the form of a reminder.

In preparation for a second campaign step, the assignment module 163 in step 312 may assign the responding customers to marketing activities of the second campaign step. This may be carried out substantially as in step 302 above, with successive assignments and reassignments of customers while minding the constraints on the marketing campaign. Step 312 may involve the same first predicted value (e.g., predicted net profit) as the first campaign step or it may involve a different value. Similar to step 302 above, the assignment module 163 does not reassign a customer to a marketing activity that the customer has previously been assigned to, for example using the binary map 164 to record each assignment.

With the assignment module 163 having arrived at a final assignment of the customers in step 312, the execution module 169 in step 313 executes the second campaign step. Similar to the description of the first campaign step above, this may involve performing marketing activities through output devices 150 in step 314. For clarity, FIG. 3 does not show any steps subsequent to step 314, but it will be understood that the marketing campaign may continue along the lines described with regard to the first campaign step. That is, following the marketing activity/-ies being performed in step 314, there may be a subsequent reception and detection of customer responses, possibly followed by assignment of customers to marketing activities for a third campaign step, and so on.

Response Sampling

It will now be described an example of predicting the outcome of a marketing campaign having more than one campaign step. With reference again to FIG. 2, the p/d step 203 involves predicting the number of customers responding to campaign step 204. In order to predict the outcome of a subsequent step, such as any of campaign steps 207, 208 or 209, it becomes desirable to predict not just how many customers will respond to the previous step, but to predict who they may be. To predict who the customers may be, one should create a target group that is representative of the customers that will respond to the campaign step. By selecting customers from the first target group according to their individual response probabilities, a sample second target group can be generated that is representative of the responding customers. Such a sample target group can be used to predict the outcome of subsequent campaign steps.

Figure 4:
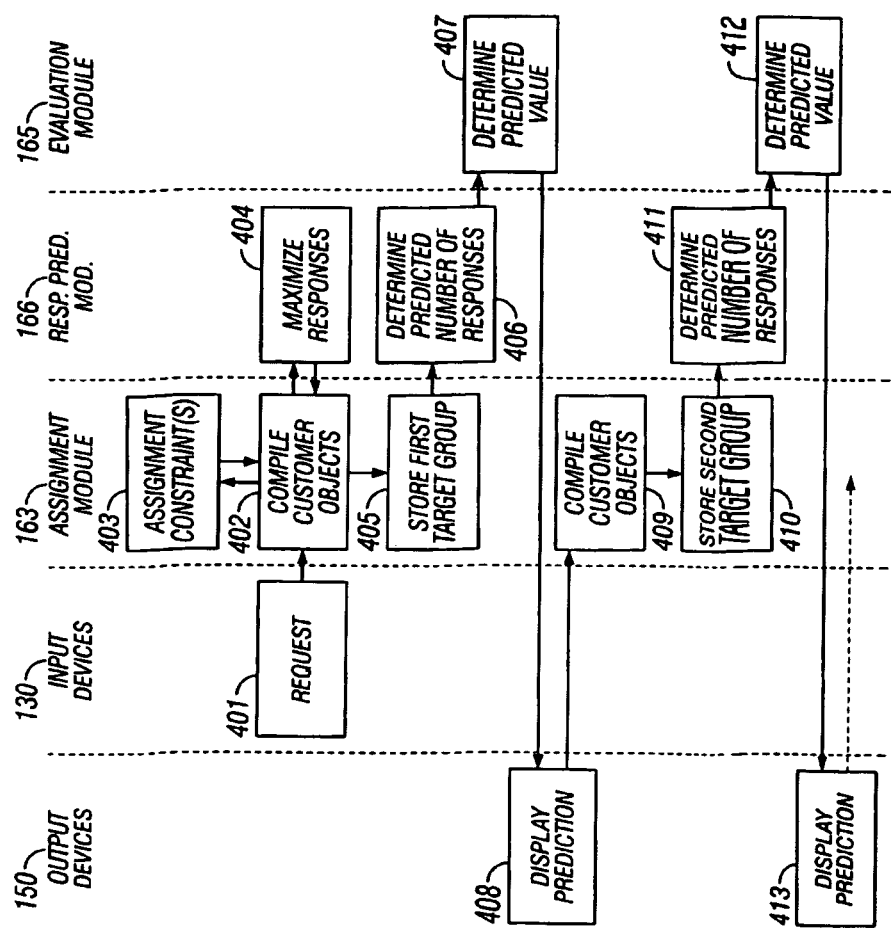
FIG. 4 is another flow diagram of a process that can be performed by the system in FIG. 1.

FIG. 4 includes steps of a process that may be performed to predict the outcome of a campaign having more than one step. In step 401, a request to initiate the procedure is received through the input devices 130. In other embodiments, a system according to the invention may initiate the process without specific user input.

The assignment module 163 begins compiling customer objects in step 402. The assignment module will use the customer objects to create a target group for the first campaign step. The assignment module takes assignment constraints into account in step 403. The request that was input in step 401 may have specified that the assignment module create a target group with particular characteristics, such as all customers who are women and who live in New York. The assignment module identifies those among customer objects 161 that meet the constraints. In this example, there are 287,400 such customers.

It is possible to specify the maximum size of the target group to be created. In this example, the request received in step 401 specified that no more than 200,000 customers be included in the target group. Using the response prediction module 166, the customers' individual response probabilities may be determined in step 404, and the customers having the lowest response probabilities may be eliminated to reduce the number of customers to the requested size. This should maximize the number of responses that can be expected from the customers. The 200,000 customer objects are stored as the first target group in step 405.

In step 406, the response prediction module predicts how many responses will be received if the first campaign step were carried out toward the first target group. In this example, it is predicted that 9,450 customers respond to the first campaign step. The evaluation module 165 can use this predicted number in step 407 to determine a predicted value of the marketing campaign so far. The predicted value and any other relevant information may be displayed to the user in step 408. For example, the output devices 150 may display information corresponding to that contained in Table 1 above. In other embodiments, the display may be made after subsequent calculations are complete.

In step 409, the assignment module compiles customer objects for a second target group, using their individual response probabilities. The response probability for a customer may be obtained by combining information that is known about the customer with statistics regarding how such information correlates with a tendency to respond to campaigns. For example, the customer's past purchasing behavior, such as how recently she made a purchase, how frequently she makes purchases, and how much money she spends on purchases, may be taken into account. This information is sometimes referred to as descriptors and may be stored with the customer object. It can also be determined whether there is any statistically significant correlation between the presence of a descriptor in customers and their response to actual campaigns. A significant correlation may be used to predict the likelihood that a customer having that descriptor will respond to a similar future campaign; that is, it can be used to determine the customer's response probability.

As an example, assume that each of the 200,000 customers in the first target group have individual response probabilities within the range of 0 to 1. The response probabilities are used in selecting customers for a second target group. The assignment module may use a random-number generator to randomly generate a number between 0 and 1, the range of the response probabilities, for each customer in the first target group. If the randomly generated number is less than the customer's response probability, the assignment module includes that customer in the second target group. If the randomly selected number is equal to, or greater, than the customer's response probability, the assignment module does not include that customer in the second target group.

This procedure is performed for all customers in the first target group to identify a number of customers for the second target group. However, the number of customers that are initially identified may be somewhat greater or smaller than the number of responses that was predicted in step 406. If the second target group is initially too large, the assignment module may sort the customers in the second target group according to their individual response probabilities and then remove the customers that have the lowest response probabilities. If, on the other hand, the second target group is initially too small, the assignment module may sort the customers in the first target group that were not selected for the second target group according to their individual response probabilities. The assignment module then adds the customers with the highest response probabilities to the second target group. Thus, the assignment module adjusts the number of customers in the second target group to be equal to the predicted number of responses. The assignment module stores the second target group in step 410.

Adjusting the number of customers in the second target group has the advantage that the numbers that are displayed to the user are consistent with each other. In the above example, if the number of predicted responses (9,450) is initially displayed to the user, the user may expect the second target group to contain exactly this number of customers. Thus, adjusting the second target group may satisfy the user's expectations. It has been found, however, that adjusting the second target group as described above may have very little or no impact on statistical accuracy and reliability as long as it is substantially equal to the predicted number. This holds true when the second target group is sufficiently large in statistical terms to be representative of the responding customers. Therefore, adjustments are not essential in obtaining a reliable predicted result.

If the second campaign step includes alternative marketing activities, such as the campaign steps 207, 208 and 209, the customers may be assigned to the campaign steps using an optimizing algorithm. For example, the algorithm described above with reference to FIG. 3 may be used. That is, the assignment module may assign and reassign customers to the alternative second campaign steps while evaluating the predicted outcome of the second campaign step, without reassigning a customer to a campaign step to which the customer has previously been assigned. In this example, it is determined that customers should be assigned to the alternative campaign steps as follows: 5,500 customers assigned to campaign step 207, 2,350 customers assigned to campaign step 208, and 1,600 customers assigned to campaign step 209.

In step 411, the response prediction module predicts the number of responses to be received if a second campaign step were performed toward the second target group. In this example, it is predicted that 578 customers will respond to campaign step 207, 202 customers will respond to campaign step 208, and 1014 customers will respond to campaign step 209. The evaluation module determines the predicted value of the marketing campaign in step 412. The evaluation module uses the predicted number of responses, the costs of contacting the second target group, and the profits per responding customer in this determination. The prediction for the first and second steps of the marketing campaign is displayed in step 413.

The simulation of the marketing campaign may end after prediction of the second step, or it may continue as indicated by the dashed arrow from step 413. Accordingly, it is possible to simulate marketing campaigns having more than two consecutive campaign steps by creating subsequent sample target groups in analogy with the description of the second target group above for each campaign step subsequent to the second campaign step.

Embodiments in General

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of predicting outcomes of marketing campaigns comprising more than one campaign step, by a computer system, the method comprising:

defining, by the computer system, a marketing campaign as including at least first and second campaign steps, the second campaign step configured to be performed after the first campaign step and only toward customers who responded to the first campaign step;

compiling first customer objects in a repository, the first customer objects corresponding to a first target group of customers registered in the computer system, at least one constraint taken into account when compiling the customer objects;

predicting, by the computer system and the first customer objects, a number of responses to be received if the first campaign step were performed toward a first target group of customers, each customer having a response probability;

compiling, by the computer system, second customer objects from the first customer objects, the second customer objects corresponding to a second target group selected from the first target group using respective response probabilities of individual customers in the first target group, the second target group being a subset of the first target group and substantially equal to the predicted number of responses;

predicting, by the computer system and the second customer objects, an outcome of performing the second campaign step toward the second target group; and generating, by the computer system, a prediction for the marketing campaign using at least the predictions regarding the first and second campaign steps.

2. The method of claim 1, wherein the response probabilities are numbers within a range, and wherein selecting the second target group comprises:

randomly selecting a number in the range for a customer in the first target group;

comparing the randomly selected number to the customer's response probability and including the customer in the second target group if the randomly selected number is less than the customer's response probability; and performing the selecting and comparing steps for all customers in the first target group.

3. The method of claim 2, wherein the range is 0 to 1.

4. The method of claim 1, wherein the second target group initially is not equal to the predicted number of responses, further comprising adjusting the second target group to be equal to the predicted number of responses.

5. The method of claim 4, wherein the second target group initially is smaller than the predicted number of responses and wherein adjusting the second target group comprises:

sorting the customers in the first target group that were not included in the second target group according to their response probabilities; and adding to the second target group those customers having highest response probability so that the second target group becomes equal to the predicted number of responses.

6. The method of claim 4, wherein the second target group initially is greater than the predicted number of responses and wherein adjusting the second target group comprises:

sorting the customers in the second target group according to their response probabilities; and removing from the second target group those customers having lowest response probability so that the second target group becomes equal to the predicted number of responses.

7. The method of claim 1, wherein the second campaign step comprises a plurality of alternative campaign elements, further comprising assigning the customers to the campaign elements using an optimizing algorithm.

8. The method of claim 7, wherein the optimizing algorithm assigns and reassigns the customers to the campaign elements while evaluating a predicted value of the second campaign step, but does not reassign a customer to a campaign element to which the customer has previously been assigned.

9. The method of claim 1, wherein determining the outcome of performing the second campaign step comprises predicting a number of responses to be received if the second campaign step were performed toward the second target group, further comprising:

selecting a third target group from the second target group using the response probabilities, the third target group being equal to the predicted number of responses for the second campaign step; and predicting an outcome of performing a third campaign step toward the third target group.

10. The method of claim 1, wherein predicting the outcome of performing the second campaign step for at least one customer comprises using one selected from the group consisting of a predicted revenue per response, a predicted profit per response, a contact cost, a response cost, and combinations thereof, each being determined individually for the customer.

11. A system for predicting outcomes of marketing campaigns comprising more than one campaign step, the system comprising:

a processor;

program instructions tangibly embodied in a computer-readable medium and comprising a response prediction module that, when executed by the processor defines a marketing campaign as including at least first and second campaign steps, the second campaign step configured to be performed after the first campaign step and only toward customers who responded to the first campaign step, the second campaign step configured to be performed after the first campaign step and only toward customer who responded to the first campaign step;

program instructions tangibly embodied in a computer-readable medium and comprising an assignment module that, when executed by the processor, compiles first customer objects in a repository, the first customer objects corresponding to a first target group of customers registered in the computer system, at least one constraint taken into account when compiling the customer objects;

program instructions tangibly, embodied in a computer-readable medium and comprising a response prediction module that, when executed by the processor, predicts, using the first costumer objects, a number of responses to be received if the first campaign step were performed toward the first target group of customers, each customer having a response probability;

program instructions tangibly embodied in a computer-readable medium and comprising an assignment module that, when executed by the processor, compiles second customer objects from the first customer objects, the second customer objects corresponding to a second target group selected from the first target group using respective response probabilities of individual customers in the first target group, the second target group being a subset of the first target group and substantially equal to the predicted number of responses;

program instructions tangibly embodied in a computer-readable medium and comprising an evaluation module that, when executed by the processor, predicts, using the second customer objects, an outcome of performing a second campaign step toward the second target group; and program instructions tangibly embodied in a computer-readable medium and comprising an evaluation module that, when executed by the processor, generates a prediction for the marketing campaign using at least the predictions regarding the first and second campaign steps.

12. The system of claim 11, wherein the response probabilities are numbers within a range and wherein the assignment module comprises a random-number generator capable of randomly selecting a number in the range for a customer in the first target group, wherein the assignment module compares the randomly selected number to the customer's response probability and includes the customer in the second target group if the randomly selected number is less than the customer's response probability, and wherein the assignment modules performs the selecting and comparing steps for all customers in the first target group.

13. The system of claim 11, wherein the response prediction module predicts a number of responses to be received if the second campaign step were performed toward the second target group, wherein the assignment module further selects a third target group from the second target group using the response probabilities, the second target group being equal to the predicted number of responses for the second campaign step, and wherein the evaluation module further predicts an outcome of performing a third campaign step toward the third target group.

14. The system of claim 11, wherein the evaluation module predicts the outcome of performing the second campaign step for at least one customer using one selected from the group consisting of a predicted revenue per response, a predicted profit per response, a contact cost, a response cost, and combinations thereof, each being determined individually for the customer.

15. Computer software, tangibly embodied in a non-transitory computer-readable medium, for predicting outcomes of marketing campaigns comprising more than one campaign step, the software comprising instructions, when executed by a processor, to perform operations comprising:
define a marketing campaign as including at least first and second campaign steps, the second campaign step configured to be performed after the first campaign step and only toward customers who responded to the first campaign step;
compile first customer objects in a repository, the first customer objects corresponding to a first target group of customers registered in the computer system, at least one constraint taken into account when compiling the customer objects;
predict, using the first customer objects, a number of responses to be received if the first campaign step were performed toward a first target group of customers, each customer having a response probability;
compile second customer objects from the first customer objects, the second customer objects corresponding to a second target group selected from the first target group using respective response probabilities of individual customers in the first target group, the second target group being a subset of the first target group and substantially equal to the predicted number of responses;
predict the second customer objects, an outcome of performing the second campaign step toward the second target group; and
generate a prediction for the marketing campaign using at least the predictions regarding the first and second campaign steps.

16. The software of claim 15, wherein the second target group initially is not equal to the predicted number of responses, further comprising:
adjust the second target group to be equal to the predicted number of responses.

17. The software of claim 16, wherein the second target group initially is smaller than the predicted number of responses and wherein adjusting the second target group comprises:
sort the customers in the first target group that were not included in the second target group according to their response probabilities; and
add to the second target group those customers having highest response probability so that the second target group becomes equal to the predicted number of responses.

18. The software of claim 16, wherein the second target group initially is greater than the predicted number of responses and wherein adjusting the second target group comprises:
sort the customers in the second target group according to their response probabilities; and
remove from the second target group those customers having lowest response probability so that the second target group becomes equal to the predicted number of responses.

* * * * *